DIGITAL INFORMATION SIGNAL MODULATING SYSTEM AND METHOD

Filed July 13, 1967 5 Sheets-Sheet 1

MICHEL CHOQUET,
INVENTOR.
by Stephen H. Frishauf
Atty

United States Patent Office 3,551,849

Patented Dec. 29, 1970

3,551,849

DIGITAL INFORMATION SIGNAL MODULATING SYSTEM AND METHOD

Michel Choquet, Epinay-sur-Seine, France, assignor to Compagnie Francaise Thomson Houston-Hotchkiss Brandt, Paris, France, a corporation of France Filed July 13, 1967, Ser. No. 653,241
Claims priority, application France, July 19, 1966, 69,843
Int. Cl. H03k 7/00
U.S. Cl. 332—9 18 Claims

ABSTRACT OF THE DISCLOSURE

A binary stepping register (30, FIG. 4), has a sequence of binary signals applied to its input (2) and steps the signals through the register stages. A clock generator (5) produces sharp needle-type sampling pulses at the same rate as the binary signal rate and these pulses serve to sample the incoming digit signals in coincidence gates (40 and 41). Of the pair of gates associated with each binary stage, one is a POSITIVE-AND gate and the other a NEGATIVE-AND gate. The sample pulses from the gate outputs are passed through capacitors (60) and selectively weighted summing resistors (70) to the input of a linear bandpass filter (10) of predetermined frequency characteristics. The filter's output signal to each weighted sum of sample pulses is a waveform comprising at least one semi-cycle of a predetermined carrier frequency, and the sequence of said output waveforms constitutes a suppressed-carrier amplitude-modulated modulating of the sequence of input signals.

This U.S. application is based under International Convention on the assignees' French patent application 69,843 filed July 19, 1966.

This invention relates to the process of modulating a carrier wave with digital information signals prior to transmission of the modulated wave over a suitable transmission medium. In the data-transmission field, a sequence of binary pulses or other digital signals representing numerical and/or other data to be transmitted, may be derived from any suitable source such as record tape. The digital signal sequence is then applied to modulate a carrier wave and the modulated carrier is transmitted over a suitable transmission link, which in many cases may comprise a voice-frequency telephone channel.

As indicated above the present invention is concerned with the modulating step in the process just outlined. Conventionally, this step has been performed in various ways, including frequency modulation, phase modulation and amplitude modulation, e.g. suppressed-carrier amplitude modulation. Generally, the modulating equipment used for this purpose has included frequency-controlled oscillators, ring modulators, and similar modulating devices of analog character. The modulated signal derived from such devices was then passed through conventional output circuits including filter circuits and applied to the transmitter unit.

Such conventional modulating devices have serious defects. They are cumbersome and cannot be constructed by the fast, cheap and efficient mass-production techniques of integrated circuitry. They are difficult to obtain with consistently uniform characteristics, are delicate to adjust, operate and maintain.

Objects of this invention are to provide improved methods and systems for modulating digital information signals, which will use predominantly digital techniques and equipment. Objects, accordingly, are to provide improved modulating systems for digital signals which will be simple and reliable in performance, and economical to produce in large part in the form of integrated circuits.

The invention is, inter alia, based on a little-used property of linear filters, according to which the output signal of such filters corresponding to a quasi-instantaneous input pulse (mathematically known as a Dirac pulse) is not instantaneous but is in the nature of an oscillatory waveform whose amplitude becomes vanishingly small after a limited number of semi-cycles. The frequency characteristics of this waveform and the number of initial semi-cycles of appreciable amplitude, are determined by the frequency characteristics of the filter used. On the other hand, the peak amplitude and phase condition of the output waveform are dependent on the magnitude and polarity of the input pulse.

According to the invention, fine, sharp, needle-type sampling pulses are generated at a rate corresponding to that of the digital input signals. These pulses serve to sample the digital signals, and produce fine, sharp, needle-type sample pulses of different polarity (and/or magnitude) depending on the digital value of the sampled signal. These sample pulses are then applied to a linear filter having selected frequency characteristics. Thus the sequence of output waveforms delivered by the linear filter constitutes a suppressed-carrier, amplitude-modulated modulation of the input signal sequence.

In preferred embodiments of the invention, means such as a stepping register are provided for storing a limited series of consecutive digital signals, the stored signals are simultaneously sampled to produce a set of sample pulses of algebraically weighted magnitude, and the resulting sum of weighted sharp needle-type sample pulses is applied to the filter. This, as will be explained, provides a means of selectively compensating for distortions in the linear filter response waveform due to imperfections in the linear filter characteristics.

Depending on the selected frequency characteristics of the linear filter, and the consequent relationship between the resulting carrier frequency and the signal transmission rate, means may have to be provided in the modulating systems of the invention for restoring phase continuity in the carrier wave as between consecutive digit segments. Means for this purpose may comprise arrangements for selectively inverting input signals of predetermined rank in the input sequence, and/or means for phase shifting the pulses applied to the linear filter input corresponding to signals of predetermined rank in the input sequence.

Figures 1, 2:
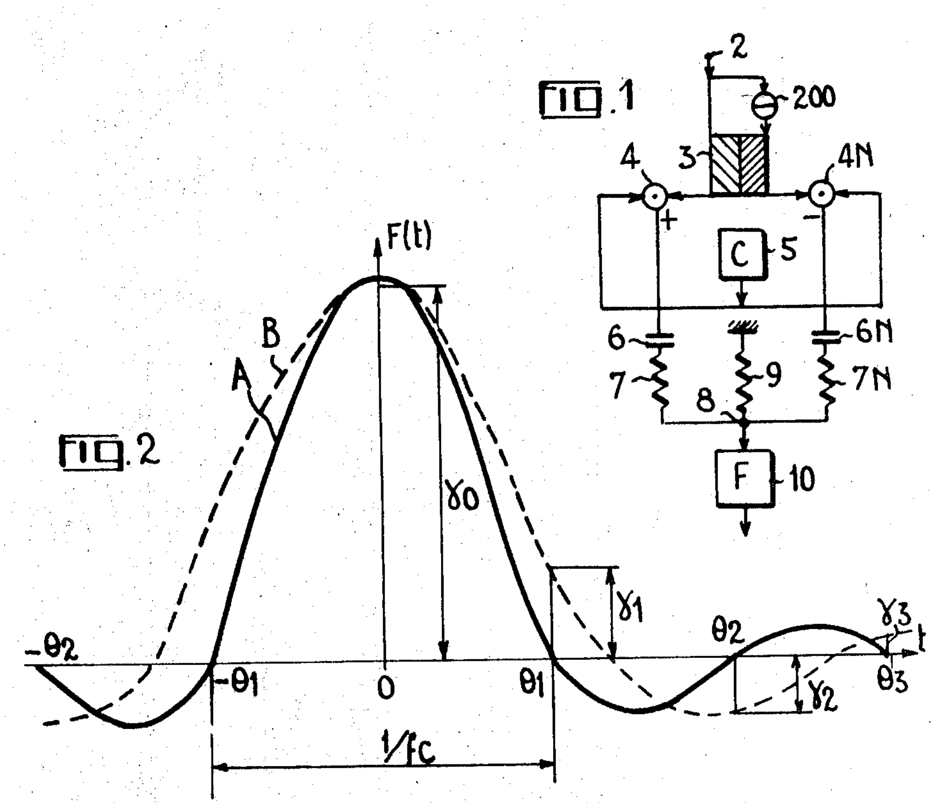
FIG. 1 is a circuit diagram, part logical and part electrical, of a simplified version of modulating circuit according to the invention.
FIG. 2 is a graph illustrating the typical time response of a linear lowpass filter to an instantaneous input pulse, and shows in dashed lines a distorted or imperfect response.

The principle of the invention will first be disclosed with reference to the basic embodiment shown in FIG. 1. To an input terminal 2 is applied a two-level digital information signal in which 1 and 0 digits may be represented, for instance, by high and low voltage levels, or by the presence and absence of a transition between such levels. The input terminal 2 is connected to the setting input of a conventional bistable circuit or binary 3 and is connected through an inverter circuit 200 to the resetting input of the binary. The set output of binary 3 is connected to one input of an AND-gate 4, and the reset output of binary 3 is connected to one input of an AND-gate 4N. The AND-gates 4 and 4N are constructed to produce signals of opposite polarity at their outputs, as indicated by the plus and minus signs shown. For this purpose, one of the two gates, say gate 4N, may comprise a combination of an AND-gate followed by an inverter or complementer circuit (not shown). Gates such as 4 and 4N may be termed AND and NOTAND (or "NAND") gates respectively. In this specification such gates will be termed "positive-AND" and "negative-AND" gates respectively. The second inputs of both gates 4 and 4N are connected to receive fine sampling pulses from a stable clock generator 5. The sampling pulses are generated at the same rate as the rate of the digital input signals. The outputs of both gates 4 and 4N are connected by way of a series capacitor-resistor combination 6–7 and 6N–7N respectively, to a common junction 8, which is connected through a resistor 9 to ground. The junction 8 is also connected to the input of a conventional linear filter 10.

The operation of the circuit is based on the fact that the output signal of a linear filter corresponding to a narrow, quasi-instantaneous voltage pulse is not instantaneous but is spread out in time according to a law which is a good approximation of a theoretical relationship as described thereafter.

More precisely, considering an ideal lowpass filter having a cutoff frequency $f_c$, the theoretical output signal delivered by the filter and corresponding to an input Dirac pulse, i.e. an infinitely narrow pulse of infinite amplitude is of the form represented by the curve A in FIG. 2. The equation of this curve is $$F(t)=\frac{\sin(2\pi f_c t)}{2\pi f_c t} \qquad (1)$$

where F($t$) is the time function of the output signal. The curve is seen to have a maximum 1 at time zero, and pass through zero at a series of equispaced points of abscissa $\theta_1$, $\theta_2$ . . . such that $$\theta_k=\frac{k}{2f_c} \qquad (2)$$

where $\pm k$ equals the successive integers 1, 2, . . .

An important property of this output signal, so-called time response signal is that its peak amplitude is proportional to the magnitude (more precisely the time integral) of the input pulse. Thus when the input pulse magnitude is doubled, the peak amplitude of the output response signal (curve A in FIG. 2) is doubled. Also, what is particularly important for the embodiments of the invention to be described in detail, when the input pulse is inverted as from positive to negative, the output response signal is similarly inverted from positive to negative.

Returning to the network of FIG. 1, it will be apparent that every sharp needle-type sampling pulse from clock generator 5 that occurs during a high-level state (H) of the input signal applied to terminal 2 one clock period earlier, is passed by positive-AND gate 4 and appears, by way of the network composed of capacitor 6 and resistors 7–9, as a positive pulse at the input of linear filter 10. Similarly, every sharp needle-type sampling pulse that occurs during a low-level state (L) of the input signal as applied to terminal 2 one clock period earlier, is passed by negative-AND gate 4N and the associated network 6N–7N–9 to appear as a negative Dirac pulse at the input of linear filter 10.

Figure 3:
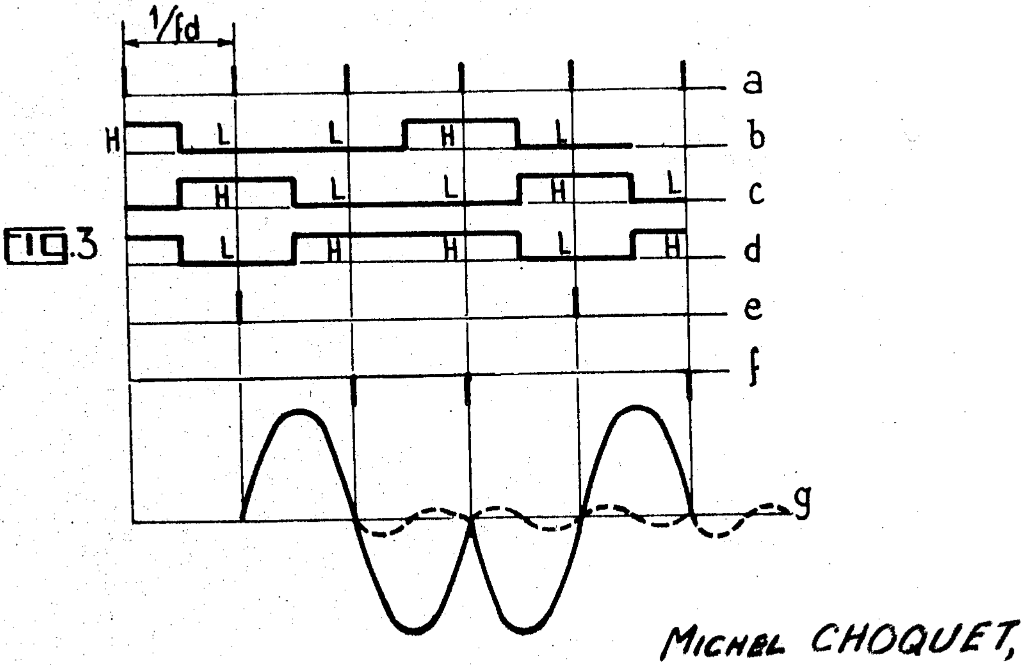
FIG. 3 is a chart showing various waveforms occurring in the basic modulating circuit of FIG. 1.

The above will be easily understood from a consideration of the waveform charts of FIG. 3. The upper line *a* indicates the equispaced sharp needle-type sampling pulses produced by clock generator 5. Line *b* shows an exemplary digital input signal applied to terminal 2, and comprising herein the bit sequence HLLHL. It will be noted that the sharp needle-type sampling pulses (line *a*) are shown as having a repetition rate $f_d$ equal to the "bit rate" of the digital input signal (line *b*) and are timed so as to occur substantially at the midpoints of the bit periods of said input signal. It will be understood that in practice, a common stable frequency generator controlling the generation of the sharp needle-type sampling pulses may be used for also producing the two-level digital input signal according to conventional keying techniques. Line *c* of the chart shows the output voltage from the set output of binary 3 which is applied to positive-AND gate 4, and it will be noted that this is a replica of the input signal waveform of line *b*, delayed by one clock period. Line *d* shows the complementary output waveform from the reset output of binary 3, which is applied to the negative-AND gate 4N. Line *e* indicates the positive pulses passed from positive-AND gate 4, occurring during the H-bit periods of the delayed input signal, and line *f* shows the negative pulses from negative-AND gate 4N, occurring during the H-bit periods of the delayed and complemented input signal.

From the earlier explanations given with reference to Equation 1 and FIG. 2 it will readily be understood that if the cutoff frequency $f_c$ or linear filter 10 is selected to be equal to the clock pulse repetition rate, or bit rate $f_d$, then the output signals produced by filter 10 in response to the positive and negative Dirac pulses applied to it will be disposed in an over-all waveform of the kind shown in line *g* of FIG. 3, building up an overall waveform which is practically equivalent to a phase modulated signal digitally coded in the two-phase keying mode, wherein H and L bits are represented as positive and negative half cycles of a common carrier frequency. It will be understood that the minor or secondary loops of each response curve, shown in dotted lines in FIG. 3, will produce some distortion in the resulting waveform but this type of distortion will not seriously affect the intelligibility of the modulated signal, because it does not affect the peak values of the signal at the midpoints of the main lobes.

The simple modulating system described with reference to FIG. 1 does, however, introduce a type of distortion that proves troublesome. Due to the imperfect frequency response of practically available filters, the output signal produced by such filters in response to an instantaneous input pulse may depart from the ideal waveform shown at A in FIG. 2 and assume a distorted shape as shown e.g. at B. As shown, the first zero crossing of the signal occurs at a somewhat later instant than it should in the theoretical case, so that at the instant $\theta_1=\frac{1}{2}f_c$ at which the output signal ought to be zero the signal has an appreciable magnitude (which represents the residual signal voltage from the precedingly transmitted bit). Such type of "zero-crossing distortion" is in many cases unacceptable and may lead to loss of information in transmission.

A preferred embodiment of the invention, now to be described with reference to FIG. 4, eliminates this difficulty. In this embodiment there is provided instead of a single binary as in FIG. 1, a multistage stepping register 30 composed of, in this example, four binaries connected in series, designated 31 through 34. The inputs of each of the stage binaries 32–34 are connected to the outputs of the preceding stage binary, while the inputs of initial stage binary 31 are connected to the input terminal 2. Each binary stage is assumed to delay the signal passed through it by one clock period. It is to be understood that conventional inter-stage delay and/or stepping means (not shown) may be provided if desired. The set outputs of all four stage binaries are connected to first inputs of respective AND-gates 40, and the reset outputs of all four binaries are connected to first inputs of respective AND-gates 41. The second inputs of all the gates are connected to receive sampling pulses from clock generator 5. The outputs of the AND-gates are connected through capacitor resistor combinations 60–70 and 61–71 to common junction 8. Junction 8 is grounded through resistor 9 and is connected to the input of a linear filter 10.

Figures 4, 5:
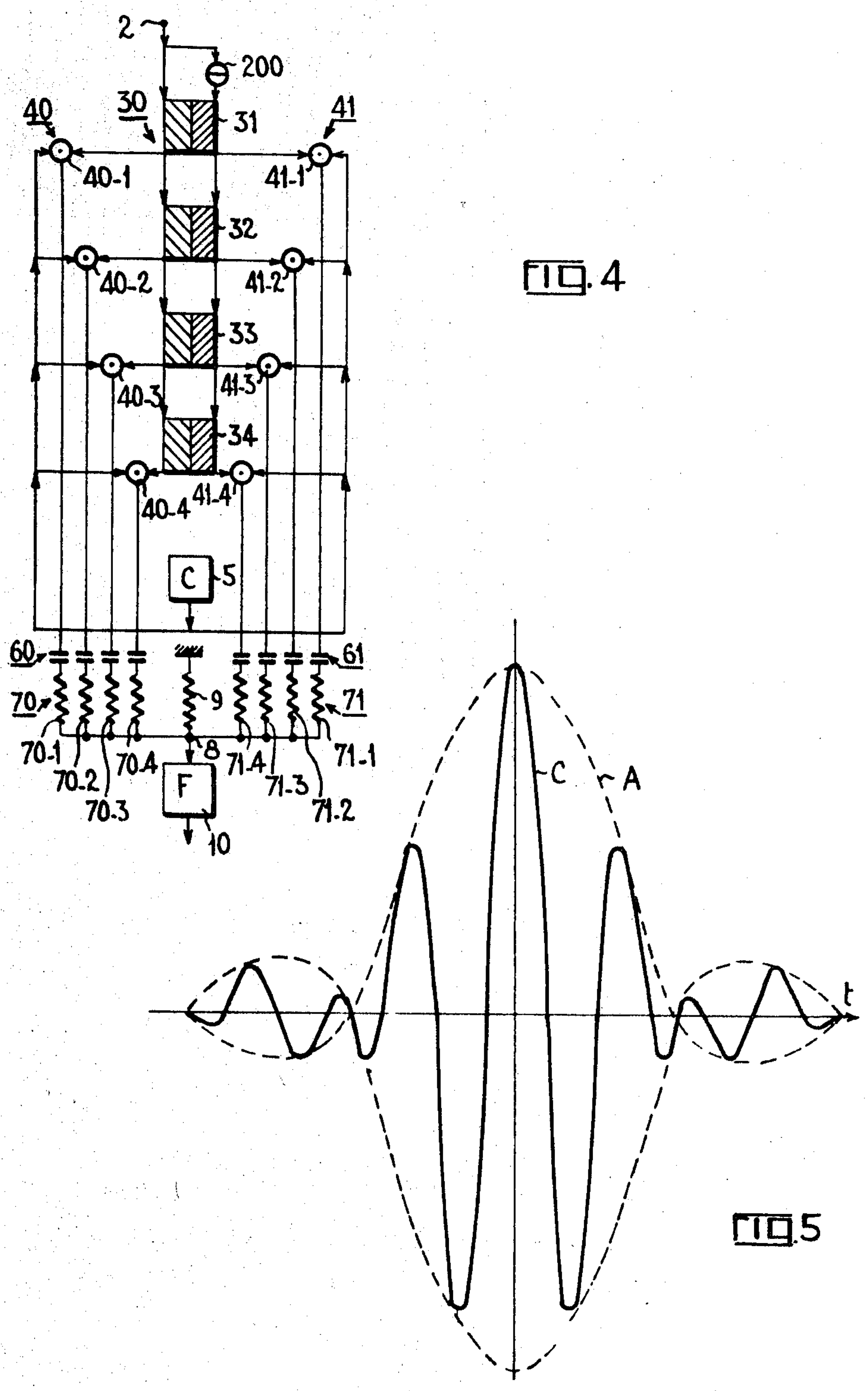
FIG. 4 is a part-logical and part-electrical circuit diagram showing a preferred embodiment of the invention.
FIG. 5 is a graph illustrating the time response of a bandpass linear filter to an instantaneous input pulse, in the case of a particular relationship between the frequencies involved.

It will be noticed that in the above description of the circuit of FIG. 4, it has not been specified which of the AND-gates 40 and 41 are positive-AND gates and which are negative-AND gates, these terms being taken with the meanings earlier defined herein. It is to be understood that in each pair of AND-gates, 40 and 41, associated with a common binary stage of register 30, one is a positive-AND gate and the other a negative-AND gate. However, in each such pair the two AND-gates connected to the set and reset outputs of the associated binary may be respectively a positive-AND gate and a negative-AND gate, or a negative-AND gate and a positive-AND gate, depending on the particular characteristics of the system, and notably on the response characteristics of the output linear filter 10, as will be made clear later.

In understanding the operation of this embodiment, it is convenient first to consider only the initial-stage binary 31 and its associated AND-gates 40–1 and 41–1 while disregarding the remaining stages; further, it may be assumed that in said initial stage the AND-gate 40–1 connected to the set output of binary 31 is a positive-AND gate and the gate 41–1 connected to the rest output is a negative-AND gate. In these conditions, it will be apparent that the simplified, single-stage system thus had is identical with the system shown in FIG. 1 earlier described, and will function in the same manner. As indicated earlier, such a single-stage system is liable to present unacceptable inter-symbol interference owing to distorted response of the practically available filters usable as the output linear filter 10. The subsequent binary stages 32, 33 and 34 of the stepping register 30 serve to develop additional, corrective responses from the output filter 10 which will act to compensate substantially for the distortion inevitably present in the response developed from the initial stage 31, and thereby eliminate the zero-crossing distortion referred to above.

The compensating procedure will be understood by referring again to FIG. 2, wherein the waveform B is assumed to represent an example of a real output signal corresponding to a sharp needle type sampling pulse applied to the output linear filter 10 used in the system. It will be observed that the actual curve B departs from the theoretical curve A in that its ordinate is too high by the amount $\gamma_1$ at the instant $\theta_1$, too low by the amount $\gamma_2$ at the instant $\theta_2$, and too high again by the amount $\gamma_3$ at the instant $\theta_3$. The desired compensating effect can thereby be approximately achieved in this case by algebraically adding, to the main or initial pulse applied to the filter input at instant $\theta_1$ a corrective pulse of reverse polarity and of magnitude $-\gamma_1$, adding to the main or initial pulse applied to the filter input at instant $\theta_2$ a corrective pulse of direct polarity and magnitude $+\gamma_2$, and adding to the main or initial pulse applied to the filter input at instant $\theta_3$ a corrective pulse or reverse polarity and magnitude $-\gamma_3$. This result will be accomplished in the system of FIG. 4 if gates 41–2, 40–3 and 41–4 (in addition to gate 40–1) are selected of the positive-AND type, and the remaining gates 41–1, 40–2, 41–3 and 40–4 of the negative-AND type. Further, the resistors 70–2 and 71–2 associated with the second stage binary would be chosen or adjusted to have a common resistance value exceeding the common resistance value of the first-stage resistors 70–1 and 71–1 by a factor approximating the ratio $(\gamma_0/\gamma_1)$, the resistors 70–3 and 71–3 would be chosen or adjusted to have another and greater value exceeding the first-stage resistor value by a factor of about $(\gamma_0/\gamma_2)$ and the resistors 70–4 and 71–4 would be chosen or adjusted to have a yet greater value exceeding the first-stage resistance value by about the factor $(\gamma_0/\gamma_3)$. The values of these ratios can, of course, be predetermined from a knowledge of the real curve (B) of the particular linear filter 10 that is used in the system, as by subjecting the filter to conventional timer-response tests.

While in the description of the correcting operation of the system of FIG. 4 it was assumed for clarity that at every clock pulse period it is the pulse delivered from the first-stage binary 31 that constitutes the main pulse (of greatest magitude) and the pulses simultaneously delivered by the second, third and fourth-stage binaries 32–34 constitute the correcting pulses of minor amplitude, this is by no means essential. The individual values of the output resistors 70 and 71 and the positive and negative character of the individual AND-gates 40 and 41 may, if desired, be so selected that the main, major-magnitude pulse applied to linear filter 10 and determining the polarity of its response or output signal, would be delivered by the second, third or fourth stage binary of register 30 rather than the first stage as described above, while the remaining binaries, both preceding and following said selected main stage binary, would then deliver corrective or distortion-compensating pulses. This type of anticipatory correction can be desirably applied in cases where the filter time delay is so great that the filter response waveform is delayed so as to present two or more zero crossings ahead of the main lobe. Also, depending on the precision of the corrective action desired, the number of stages in register 3 may be as small as two, or it may be greater than the four shown.

In the invention as so far disclosed it has been assumed that the output linear filter 10 is a low-pass filter. However, in a preferred aspect of the invention a linear bandpass filter is used as the output filter of the system, since this permits better line utilization. This important aspect of the invention will now be described.

Considering a linear bandpass filter having the lower and upper cutoff frequencies $f_1$ and $f_2$, we can define two frequencies $f_c$ and $f_p$ by:

$$f_c=\frac{1}{2}(f_2-f_1) \text{ and } f_p=\frac{1}{2}(f_1+f_2) \tag{3}$$

The theoretical output signal of such a linear bandpass filter corresponding to a Dirac-type input pulse, is given by the equation:

$$G(t)=\frac{\sin(\pi f_c t)}{2\pi f_c t}\cos(2\pi f_p t) \tag{4}$$

where G$(t)$ is the time function of the output signal. Using now the time function F$(t)$ as defined (Equation 1) in the case of the linear lowpass filter of cutoff frequency $f_c$, we can write:

$$G(t)=F(t).\cos(2\pi f_p t)$$

where F$(t)$ is the same expression as in Equation 1.

The time-curve representing Equation 4 is substantially as shown in full lines at (C) in FIG. 5, for the exemplary case where $f_p=3f_c$ that is, where $f_2=2f_1$. The curve is seen to have an envelope (shown dotted) which is identical with the curve (A) shown in FIG. 2 and its symmetrical curve about the time axis. Further, the curve (C) vanishes at a number of time points intermediate the adjacent zeroes of the envelope curve (A), at times defined by equating with zero the cosine factor in Equation 4, i.e. times $$\tau_m = \frac{2_m + 1}{4f_p}$$

where $m$ is any integer or zero.

The curve (C) as represented by Equation 4 may be considered as being a suppressed-carrier amplitude-modulation waveform in which $f_p$ is the carrier frequency, and $f_c$ the modulation frequency. According to the invention, many different relationships can be provided between the frequencies $f_c$ and $f_p$ as determined by Equations 3 from the characteristics of output linear filter 10, while still enabling a fully satisfactory operation of the modulating system of the invention. An important requirement, in selecting the frequency values $f_c$ and $f_p$ with respect to one another, is that there should be no phase discontinuity of the carrier wave at the sampling instants initiating consecutive binary digit segments of the information sequence to be transmitted. This phase-continuity condition can be fulfilled while using any of various simple numerical relationships between the modulation and carrier frequencies $f_c$ and $f_p$, although in some cases the basic modulating circuit of FIG. 4 may have to undergo suitable modification in order to provide for the phase-continuity requirement, as will appear presently. A few specific cases will now be discussed by way of illustration with reference to FIG. 6.

Lines (*a*) through (*d*) of that figure illustrate in full lines the basic carrier waveforms obtained by the process of the invention for four respective ratios of the frequency values $f_c$ and $f_p$. In each case, each graph segment between consecutive vertical lines indicates one binary digit position or bit segment, i.e. the time period $1/f_d$ where $f_d$ is the "bit rate" earlier referred to. In each case, the bit rate $f_d$ is taken at the maximum value usable without inter-symbol interference as is well-known from Nyquist's fundamental theory, which maximum value is twice the modulation frequency, that is $f_d = 2f_c$. It may be assumed that the keying scheme used is to modulate the 1 and 0 digits as positive and negative polarities. Demodulating at the receiver end then will involve phase-discriminating the received signal against the carrier frequency $f_p$.

In the first case shown in line *a* the relationship between carrier and modulation frequencies is $f_p = 2f_c$. In other words, two semi-cycles of the carrier frequency $f_p$ are used per bit segment. To accomplish this the frequency characteristics of the output linear bandpass filter may be predetermined as follows. If for example the bit transmission rate $f_d$ is 1,800 bauds (or bits per second), then in view of the equation $f_d = 2f_c$, we are to have $f_c = 900$ c.p.s. and $f_p = 1,800$ c.p.s. From the definitions of $f_c$ and $f_p$ given by Equation 3, we see that the output linear bandpass filter should be selected to have the lower and upper cut-off frequency values $f_1 = 900$ c.p.s. and $f_2 = 2,700$ c.p.s. Since the basic, uncoded carrier wave shown in line *a* is seen not to present any phase discontinuity between adjacent bit segments, no special precautions are required in this respect and the system disclosed with reference to FIG. 4 may be used without modification provided the output filter 10 is a linear bandpass filter having the characteristics just specified. The same would hold for all cases where the carrier frequency is an even multiple of the modulation frequency, i.e. $f_p = 2kf_c$ ($k$ any positive integer), provided the filter frequency characteristics are selected accordingly.

In the case illustrated in line *b* the relationship between carrier and modulation frequencies is $f_p = 3f_c$. Three semi-cycles of the carrier frequency $f_p$ are here used per bit segment. The output linear bandpass filter characteristics may here be predetermined as follows. There may be used a bit rate $f_d = 1,200$ bauds, in which case $f_c = 600$ c.p.s. and $f_p = 1,800$ c.p.s. The output linear bandpass filter would then be selected to have the lower and upper cut-off frequencies $f_1 = 1,200$ c.p.s. and $f_2 = 2,400$ c.p.s. The basic carrier wave thus obtained is seen to present a phase discontinuity between adjacent bit segments. As indicated earlier it is much preferred according to the invention to eliminate these phase discontinuities in the modulating system in order to facilitate the subsequent demodulation procedure. To eliminate the phase discontinuities it is necessary to reverse the carrier waveform in every other bit segment, as indicated in dotted lines for the even-numbered bit segments in the chart, line *b*. This may conveniently be accomplished by connecting a parity-selective reversing logic, between the information input terminal 2 and the input to the initial binary stage 31 of register 30 in FIG. 4. FIG. 7 illustrates this embodiment of the invention, and only the differences thereof with respect to the embodiment of FIG. 4 will be described. The parity-selective logic generally designated 80 is seen to include a bistable circuit 82 of the type having a single input and switchable to its alternate stable states by consecutive pulses applied to said input. The single input of binary 82 is connected to the output of clock generator 5. The set and reset outputs of binary 82 are connected to first inputs of respective AND-gates 84 and 86. Gate 86 has its other input connected to the information-input terminal 2 directly, while gate 84 has its other input connected to terminal 2 by way of a complementing or inverting circuit 88. The outputs of gates 84 and 86 are connected to respective inputs of an OR-gate 89 whose output is applied to the inputs of the initial-stage binary 31 of register 30. With the arrangement thus described, it will be evident that due to the alternate setting and resetting of parity-responsive binary 82 by the successive clock pulses, the information bits applied from terminal 2 to the register binary 31 will alternately be unaltered as compared to the bits applied to terminal 2 (say in every odd bit segment), and will be inverted as compared to the bits applied to terminal 2 (say in every even bit segment). The carrier waveform is thus rendered continuous as to phase. The statements made with reference to line *b* of FIG. 6 hold generally for all cases where the carrier frequency $f_p$ is an odd multiple of the modulating frequency, i.e. $f_p = (2k+1)f_c$ where $k$ is zero or any positive integer.

Figure 6:
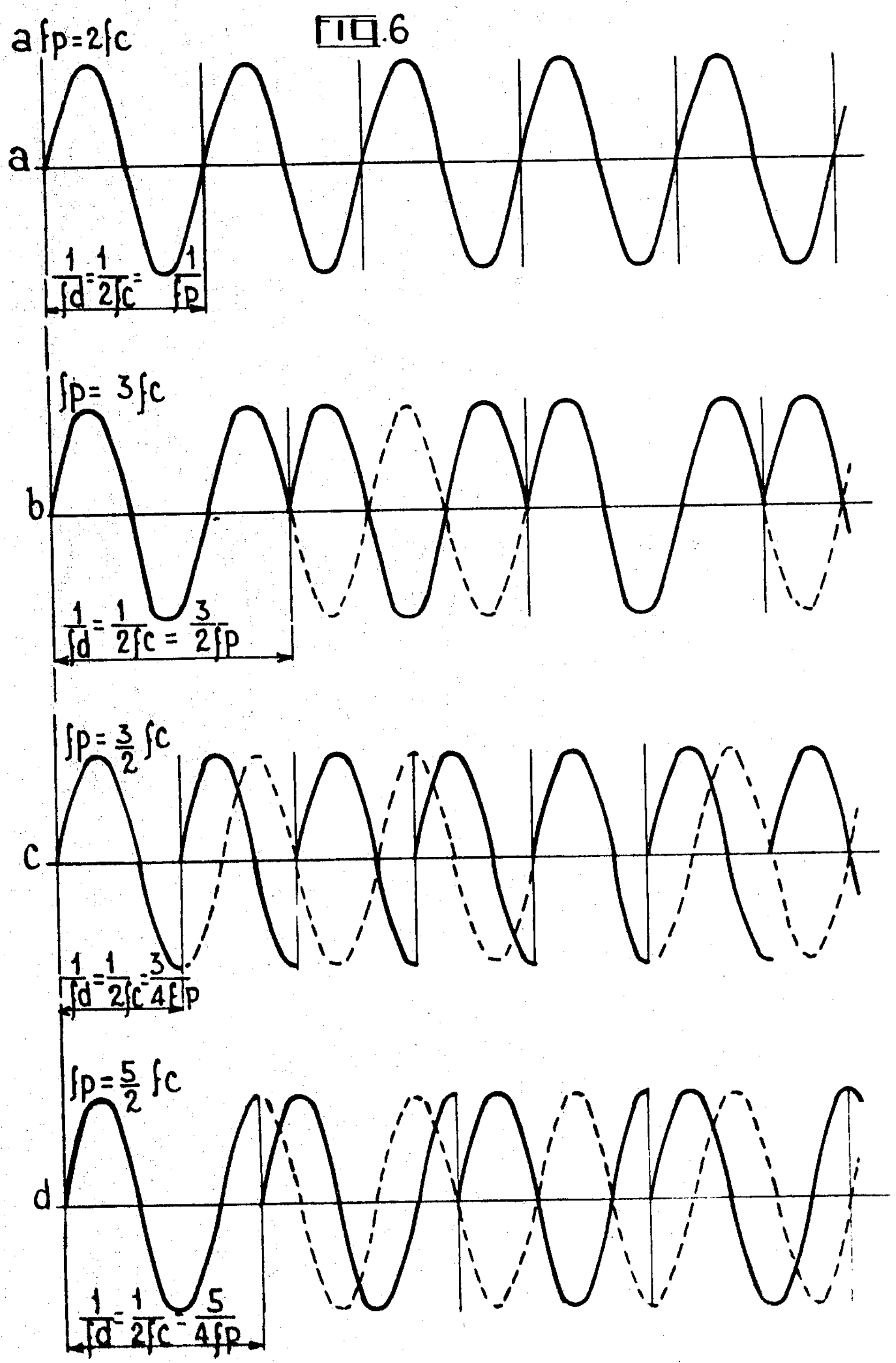
FIG. 6 illustrates the carrier waves obtainable by the method of the invention in four different cases involving different relationships between the characteristic frequencies of the output linear filter used.
Figure 7:
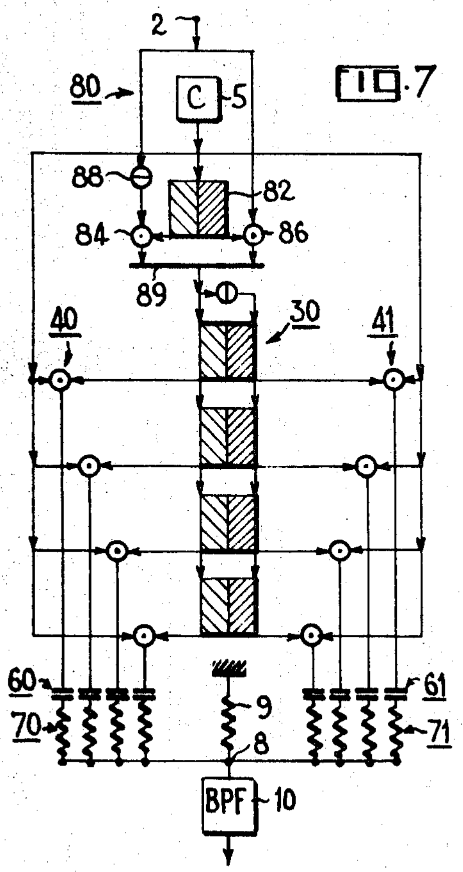
FIG. 7 is a circuit diagram showing an embodiment of the invention generally similar to that of FIG. 4 but including additional logic for inverting or complementing every other input signal.

In the case shown in line *c* of FIG. 6 the relationship between carrier and modulation frequencies is $f_p = 3f_c/2$. One-and-one-half semi-cycle of the carrier frequency occurs per bit segment. Using a bit rate of 2,400 bauds, $f_c = 1,200$ c.p.s. and $f_p = 1,800$ c.p.s. It is seen from Equation 3 that the output linear bandpass filter should be selected to have the cutoff frequencies $f_1 = 600$ c.p.s. and $f_2 = 3,000$ c.p.s. The resulting waveform is seen to be discontinuous between adjacent bit segments, and the manner in which this difficulty may be overcome will be described presently.

In the case shown line *d* of FIG. 6, the carrier and modulation frequencies are related as $f_p = 5f_c/2$. Two-and-a-half semi-cycles of the carrier frequency occurs per bit. Using a bit rate of 1,200 bauds, $f_c = 600$ c.p.s. and $f_p = 1,500$ c.p.s. It then follows from Equation 3 that the output linear bandpass filter should be selected with the following lower and upper frequency limits: $f_1 = 900$ c.p.s. and $f_2 = 2,100$ c.p.s.

In both cases *c* and *d* last discussed, there is a 90° phase discontinuity in the carrier wave between bit segments as will be immediately evident. In the *c* case, and more generally in all cases where $$f_p = \frac{4k-1}{2} f_c$$

where $k$ is a positive integer, it will be apparent from the figure that the carrier waveform in each bit segment leads 90° over that in the preceding segment, i.e. there is a phase displacement of $+90°$. Similarly, in the *d* case and more generally wherever $$f_p=\frac{4k+1}{2}f_o$$

there is a phase displacement of 90° between bit segments. In either case, the modulation waveform can be rendered continuous by modifying the system of FIG. 4 in the way now to be described with reference to FIG. 8.

Figure 8:
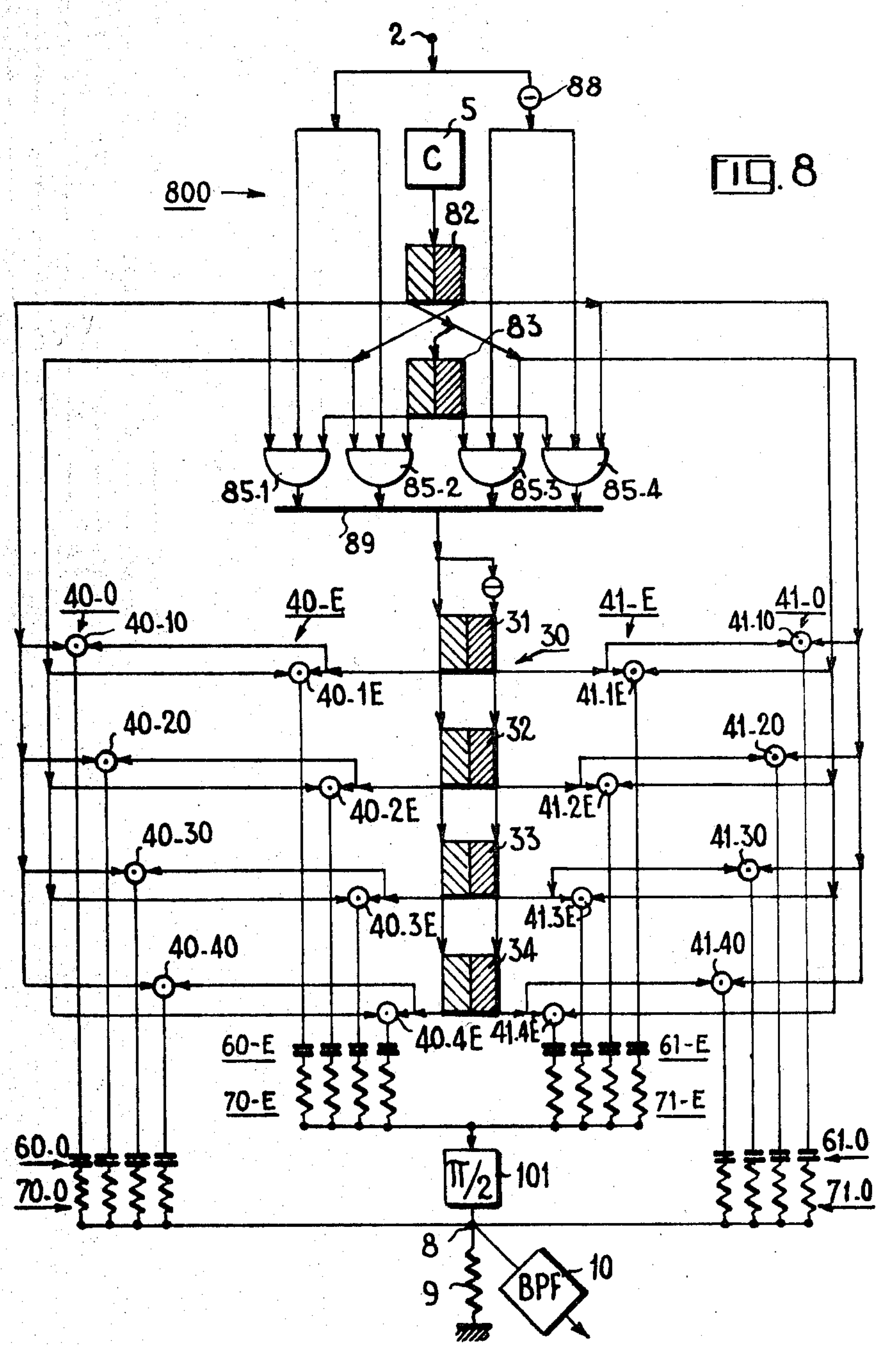
FIG. 8 is a circuit diagram showing yet another embodiment generally similar to that of FIG. 4 but including additional logic for inverting every other pair of consecutive input signals, and for phase shifting every other one of the pulses applied to the linear filter.

In FIG. 8 components corresponding to those in FIG. 4 or FIG. 7 are correspondingly numbered. The system includes a stepping register 30 comprising four stages in this example and similar to the stepping register of FIG. 4. The information input terminal 2 is applied to the input of the first-stage binary 31 by way of a logic unit generally designated 800. This logic includes a four-counter which comprises the pair of cascaded single-input binaries 82 and 83. 82 is a parity binary corresponding to the parity binary 82 in FIG. 7, and has its single input connected to the clock generator 5, and its set output connected to the single input of binary 83. The set and reset outputs of both binaries 82 and 83 are applied in pairs to the four AND-gates 85–1 through 85–4 constituting a matrix network. It will be readily seen that in every series of four consecutive clock pulses from generator 5, a first pulse is passed by gate 85–1, the next is passed by gate 85–2, the third by gate 85–3, and the last by gate 85–4, whereupon the sequence repeats. Third inputs of gates 85–1 and 85–2 are connected to input terminal 2 directly, while third inputs of gates 85–3 and 85–4 are connected to terminal 2 through complementing or inverter circuit 88. The outputs of all four AND-gates 85 are applied to the input of first-stage binary 31 through OR-gate 89.

The effect of the logical unit 800 just described is to invert or complement every other pair of two consecutive input bits applied to register 30, while leaving the intervening pair of two consecutive input bits. Thus, considering again line *c* of FIG. 6, it will be understood that if the system of FIG. 8 differed from that of FIG. 4 only in the provision of logic unit 800, the output of the system would be a waveform which would be identical with the full-line curve shown in the bit segments numbered 1, 2; 5, 6; and so on, while being inverted with respect to the said full-line curve in the bit segments numbered 3, 4; 7, 8; and so on. All that now remains to be done in order to obtain a waveform coinciding with the continuous curve shown in dashed lines, is to shift the waveform 90° forward in each of the even-numbered segments 2, 4, 6, 8, . . . Similarly, in the case shown in line *d*, it would be necessary to shift the waveform 90° rearward in each even-numbered segment. This is accomplished as follows in the embodiment being described. Each output of each stage binary of register 3, instead of being connected to a single AND-gate as in FIG. 4, is connected to two AND-gates in parallel. Each pair of AND-gates connected to a stage output are designated by the same numerical reference as the corresponding single AND-gate in FIG. 4, followed by the suffixes O (odd) and E (even) respectively. All of the O AND-gates have their second inputs connected to one output of the parity-responsive binary 82 and all of the E AND-gates have their second inputs connected to the other output of binary 82. Further, all of the O gates have their outputs connected by way of capacitor-resistor lines 60–O—70–O directly to the common junction 8, which is grounded through summing resistor 9 as in FIG. 4, whereas all of the E gates have their outputs connected by way of C–R lines 61–E—71–E to junction 8 by way of a 90° phase shifter 101, as shown. It will be understood that of the pair of O gates associated with each binary stage one is a positive-AND gate and the other a negative-AND gate; and that the same is true of the pair of E gates associated with each binary stage. As to which gate in each such pair is positive-AND and which negative-AND, depends upon the precise character of the corrective function prescribed for the individual binary register stages as was earlier described with reference to FIG. 4, and further depends on whether the 90° phase shift to be imparted to the output waveform in every other (say even-numbered) bit segment is leading, as in the case *c* of FIG. 6 or lagging as in case *d*.

The precise pattern of positive- and negative- AND-gate connections to be used in any specific instance will be readily determined in the light of the foregoing disclosure. Assume that the type of correction prescribed as a result of tests performed on the output linear bandpass filter 10 used is such as to require the initial binary register stage 31 to deliver the main pulse (the pulse determining the polarity of the output waveform for the bit segment considered) and the subsequent three binary stages 32, 33 and 34 to deliver correcting pulses of minor amplitude, with stage 32 providing a pulse of reverse polarity from that of the main pulse, stage 33 providing a pulse of the same polarity as that of the main pulse, and stage 34 providing a pulse of reverse polarity again. Then, in the case of FIG. 6 line *c*, gates 40–1O and 40–1E would be positive-AND, gates 40–2O and 40–2E negative-AND, gates 40–3O and 40–3E positive-AND, and gates 40–4O and 40–4E negative-AND. Thus the system of FIG. 8 makes it possible to ensure the desired phase-continuity in the carrier waveform while providing for a proper correcting action according to the process earlier described. It will be understood that while the form of circuit shown in FIG. 8 is advantageously simple in that it uses a single four-stage stepping register and a single phase shifter with a minimum of additional logical circuit components, equivalent results could be obtained by means of various other circuits.

In all of the embodiments disclosed, double-sideband, suppressed-carrier amplitude modulation was used. However, the invention is also applicable to residual-sideband, suppressed-carrier amplitude modulation, for which purpose it would simply be necessary to use a conventional type of vestigial-sideband bandpass filter as the output filter 10 of the system, as will be readily understood. Also, while the bit transmission rate in bauds was in all of the examples assumed to be equal to the bit-per-second rate, this is not necessarily the case. Thus, a multi-level suppressed carrier amplitude-modulation process may be applied in the system of the invention, as by suitably varying the output summation resistance. In such cases the bit-per-second rate would differ from the transmission rate in bauds, e.g. would be twice said latter rate.

Figure 9:
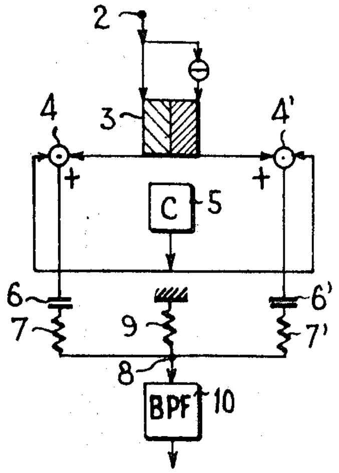
FIG. 9 is a simplified embodiment somewhat similar to FIG. 1, but using two-level amplitude modulation.

FIG. 9 illustrates such an embodiment of the invention in a simple form generally similar to that of FIG. 1. As shown, the binary 3 has its input connected to input terminal 2 and its outputs connected to first inputs of the respective AND-gates 4 and 4', which in this case are both positive-AND gates, that is, each gate delivers a positive pulse in response to the simultaneous energizing of both its inputs, as indicated by plus signs. The outputs of gates 4 and 4' are connected through capacitor-resistor lines 6–7 and 6'–7' respectively, to a common junction 8 connected to the input of linear filter 10. Junction 8 is further connected through resistance 9 to ground. The two resistors 7 and 7' are selected with different values, with resistor 7 being, e.g. one half value of resistor 7'. In this way, the sharp pulses applied to linear filter 10 in response to one digital value, say "high," of the input signal have twice the magnitude of the pulses applied to the filter in response to another value, say "low."

Figure 10:
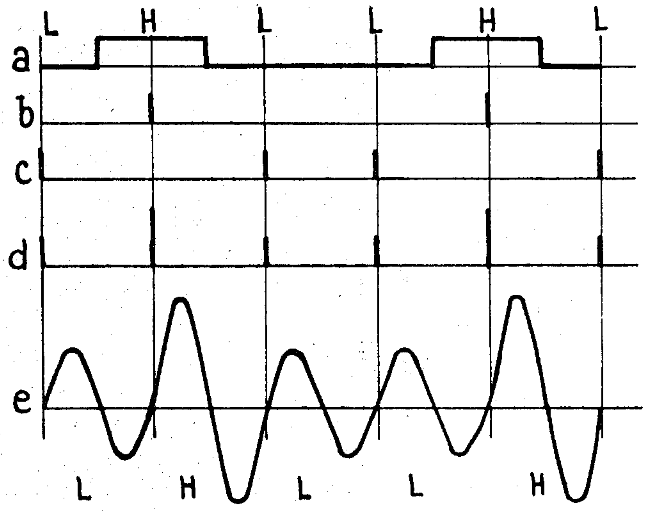
FIG. 10 shows a waveform chart for explaining the operation of the embodiment shown in FIG. 9.

FIG. 10 illustrates the resulting operation in the case of an input digit sequence LHLLHL, as shown in line *a*. Lines *b* and *c* indicate the positive pulses delivered by gates 4 and 4' respectively. Line *d* shows the sequence of pulses applied at junction 8 to linear filter 10, and it will be noted that the sample pulses corresponding to L input levels are shown one half the magnitude of the sample pulses corresponding to H levels. Line *e* shows the resulting response at the output of linear filter 10, in the case where the filter characteristics are selected so that the filter time response comprises a full carrier cycle as earlier explained. It will be seen that a two-level suppressed-carrier amplitude modulation has been obtained. The embodiment of FIG. 9 can readily be transposed to provide for a correcting action as earlier disclosed, and can be combined with any one of the systems disclosed with reference to FIGS. 4, 6, 7 and 8.

Among the advantages of the modulating systems of the invention is the fact that they are largely digital in character. They therefore are simple to adjust, operate and maintain and possess high reliability. They can be easily and cheaply constructed by series production methods using integrated circuitry in whole or in large part, that is, apart from the output linear filter and associated output circuitry. The systems disclosed moreover have high flexibility as will be aparent from the various examples disclosed, such flexibility being in part due to the possibility of selecting the frequency characteristics of the output linear filter in accordance with the requirements in each instance of use, and also due to the latitude had in selecting the output resistances in order to compensate for distortion in the output waveforms introduced by imperfections in said output linear filter and other causes, and also in order to obtain multi-level amplitude modulation as disclosed with reference to FIGS. 9 and 10 should this be desired.

While binary digital signals were referred to herein since this type of application is especially useful, it will be evident that the principles of the invention would be applicable to data signals coded in other than binary numeration, for example three-valued signals. In such case, each of the stages of the stepping register 30 would be provided in the form of a three-state or ternary circuit, and there would be a coincidence gate connected to each of the three outputs thereof. Of the three gates, two may be positive coincidence gates connected to weighting resistors of different values, while the third may be a positive or a negative gate.

In all cases, the algebraic weighting function disclosed as being performed by means of the positive and/or negative AND-gates, and the weighting output resistors 70, 71, could still be accomplished.

What I claim is:

1. In a digital signal processing system the combination comprising:

means (3, 30) delivering a sequence of digital input signals corresponding to digital data;

means (5) generating sharp needle type sampling pulses at a rate corresponding to the rate of said digital input signals;

sampling means (4, 4N; 40, 41; 4, 4′) having first input means connected for receiving each of said input signals from said signal-delivering means and second input means connected for receiving said sample pulses, and having output means delivering sharp needle type sample pulses corresponding in at least one of the characteristics polarity and magnitude, with the digital value of each input signal; and linear filter means (10) having a frequency bandwidth in the order of the repetition rate of said sampling pulses connected for receiving said sample pulses and producing a response to each of said pulses in the shape of an output waveform corresponding in a characteristic thereof to said characteristic of the pulse, whereby the sequence of said output waveforms from the linear filter means is a modulated signal representative of said digital input signals.

2. In a digital signal-processing system the combination comprising:

multi-stage stepping means (30) connected for receiving a sequence of digital input signals and having a series of stage output means each delivering a respective delayed version of each signal delayed a number of digital periods corresponding to the serial rank of the stage in the series;

means (5) generating sharp needle type sampling pulses at a rate corresponding to that of the digital input signals;

sampling means (40, 41; 4, 4′) associated with each stage output means and each having first input means connected for receiving said delayed signal therefrom and second input means connected for receiving said sampling pulses, and having output means delivering sharp needle type sample pulses corresponding in at least one of the characteristics polarity and magnitude with the digital value of the associated delayed signal;

summing means (70, 71, 9; 7, 7′, 9) connected to the outputs of said sampling means; said sampling and summing means including means for algebraically weighting the magnitudes of the sharp needle type sample pulses by selectable amounts as between respective stages of said series so as to produce an algebraically weighted sum pulse; and linear filter means (10) having a frequency bandwidth in the order of the repetition rate of said sampling pulses connected for receiving said sum pulses and delivering an output response to each sum pulse in the shape of an output waveform corresponding in a characteristic thereof to said characteristic of a predetermined one of said sharp needle type sample pulses, whereby the sequence of said output waveforms is a modulated signal representative of said digital input signals.

3. The system defined in claim 1, wherein said sampling means comprise coincidence gates.

4. The system defined in claim 2, wherein said stepping means comprise a stepping register comprising a series of binary stages (31–34), said sampling means comprise coincidence gates (40, 41), each having one input connected to a respective output of each of said binary stages and another input connected to said generating means (5), and said summing and weighting means comprises impedances (70, 71) of selected different magnitudes connecting the outputs of said coincidence gates with the input of said linear filter (10).

5. The system defined in claim 4, wherein said coincidence gates associated with each binary stage include a positive coincidence gate and a negative coincidence gate.

6. The system defined in claim 1, including logical means (80, 800) responsive to the rank of said digital input signals in said sequence for selectively processing signals of predetermined rank.

7. The system defined in claim 6, wherein said logical means (80, 800) includes a complementing circuit (88) connected for complementing the input signals of predetermined ranks in said sequence.

8. The system defined in claim 6, wherein said logical means (80, 800) includes parity-sensing means (82) connected for sensing every other digital signal in the sequence.

9. The system defined in claim 6, wherein said logical means (80, 800) includes N-counter means (82, 83, 85) connected for sensing every N-th digital signal in said sequence.

10. The system defined in claim 1, wherein said sampling means includes a first (40–O, 41–O) and a second (40–E, 41–E) sets of coincidence gates, phase shift means (101) connecting the output means of at least one of said set of gates to said linear filter means (10), and further comprising parity-sensitive means (82) connected to said generating means (5) for producing sharp needle type sampling pulses on one or on another sampling pulse line depending on the parity of the digital input signal, means connecting the second input means of said first set of coincidence gates with said one sampling pulse line and means connecting the second input means of said second set of coincidence gates with said other sampling pulse line, whereby to phase-shift the output waveform of said linear filter (10) in response to every other input signal.

11. A method of modulating digital input signals comprising:

generating a sequence of sharp needle type sampling pulses at a repetition rate corresponding to that of said digital input signals;

sampling each digital input signal with a sampling pulse whereby to produce a sequence of sharp needle type sample pulses corresponding in at least one of the characteristics polarity and magnitude with the digital values of said signals; and applying said sharp needle type sample pulses to a linear bandpass filter having a frequency bandwidth in the order of the repetition rate of said sampling pulses;

the frequency characteristics of said bandpass filter being so predetermined that the output response thereof to each of said sharp needle type sample pulses is a waveform comprising at least one semicycle of a prescribed carrier frequency;

whereby the sequence of said output waveforms is a modulated signal representative of said digital input signals.

12. A method of modulating digital input signals comprising:

generating a sequence of sharp needle type sampling pulses at a rate corresponding to that of said digital signals;

sampling each of a limited series of consecutive digital signals with a sampling pulse whereby to derive from each of said signals a sharp needle type sample pulse corresponding in at least one of the characteristics polarity and magnitude with the digital value of said signal;

algebraically weighting the magnitudes of the sample pulses derived from the respective signals of said limited series and adding the weighted pulses to produce a sum pulse;

and applying the sum pulse to a linear bandpass filter having a frequency bandwidth in the order of the repitition rate of said sampling pulses;

the frequency characteristics of said bandpass filter being so predetermined that the output response thereof to each of said sum pulses is a waveform comprising a prescribed segment of a prescribed carrier frequency;

whereby the sequence of said output waveforms is a modulated signal representative of said digital input signals.

13. The method of claim 11, including the step of sensing the position of said signals and selectively complementing digital input signals of predetermined numerical position in said sequence.

14. The method of claim 11, including the step of sensing the position of said signals and selectively phase-shifting said weighted sharp needle type sample pulse sums corresponding to digital input signals of predetermined position prior to application to said bandpass filter.

15. The method of claim 11, wherein the repetition rate of said digital input signals and said sampling pulses substantially equals the frequency bandwidth of said bandpass filters ($f_d=f_2-f_1=2f_c$).

16. The method of claim 15, wherein said bandpass filter frequency characteristics are so predetermined that said carrier frequency is an integral multiple of said repetition rate ($f_p=Kf_d=2Kf_c$).

17. The method of claim 15, wherein said bandpass filter frequency characteristics are so predetermined that the carrier frequency is an odd multiple of one half the said repetition rate, and including the further step of complementing every other input signal $$\left(f_p=\frac{2K+1}{2}f_d=(2K+1)f_c\right)$$

18. The method of claim 15, wherein said bandpass filter frequency characteristics are so predetermined that the carrier frequency is an odd multiple of one quarter of said repetition rate, and including the further steps of complementing every other pair of input signals, and phase shifting every other sample pulse prior to application thereof to said bandpass filter $$\left(f_p=\frac{2K'+1}{4}f_d=\frac{2K'+1}{2}f_c\right)$$

References Cited

UNITED STATES PATENTS 2,807,783 9/1957 Vasseur ............ 332—11

ROY LAKE, Primary Examiner

L. J. DAHL, Assistant Examiner

U.S. Cl. X.R.

332—11